United States Patent [19]

Hagin et al.

[11] Patent Number: 4,716,730
[45] Date of Patent: Jan. 5, 1988

[54] HYDROSTATIC DRIVE

[75] Inventors: Faust Hagin, Munich; Stefan Martini, Ulm; Hans J. Drewitz, Munich, all of Fed. Rep. of Germany

[73] Assignee: M A N Nutzfahrzeuge GmbH, Munich, Fed. Rep. of Germany

[21] Appl. No.: 838,243

[22] Filed: Mar. 10, 1986

[30] Foreign Application Priority Data

Mar. 13, 1985 [DE] Fed. Rep. of Germany ....... 3508886
Nov. 7, 1985 [DE] Fed. Rep. of Germany ....... 3539561

[51] Int. Cl.⁴ .......................... F16D 1/02; F16D 39/00
[52] U.S. Cl. .......................................... 60/456; 60/493
[58] Field of Search ................................ 60/487–490, 60/493, 456, 464, 465, 466, 435, 436

[56] References Cited

U.S. PATENT DOCUMENTS 3,672,167  6/1972  Griesenbrock ..................... 60/465
3,866,421  2/1975  Kersten et al. ................. 60/464 X
4,002,028  1/1977  Budzich ........................... 60/456 X

*Primary Examiner*—Edward K. Look
*Attorney, Agent, or Firm*—Alan H. Levine

[57] ABSTRACT

In a hydrostatic drive one hydrostatic machine (2 and 4) is adapted for absorbing the sustained braking power or energy. The transmission is furthermore provided with a cooler (9) whose two sides are respectively connected via a threshold pressure valve (7 and 8) with one of two branch ducts (3 and 5) which connect the said hydrostatic machine with a second such machine adapted to act as a drive. The pressure threshold valve is made up of a pressure limiting and check valve.

4 Claims, 8 Drawing Figures

HYDROSTATIC DRIVE

BACKGROUND OF THE INVENTION

The invention relates to a hydrostatic drive and more particularly to such a drive for road trucks and omnibuses, comprising two adjustable hydrostatic machines connected to each other by two branches of a duct and of which the one is adapted to act as a pump and the other as a motor dependent on the mode of operation, pressure limiting and check valves for connecting the two duct branches, and a feed pump and a storage tank, said feed pump being connected with said tank for the supply of hydraulic fluid therefrom.

Generally speaking such a drive is suitable for all road and railroad vehicles and is more particularly to be used with road trucks and omnibuses, although it may also be utilized in elevator and like installations for instance.

In the case of a hydrostatic drive of this type employed as a vehicle transmission one respective hydrostatic machine is connected with the drive engine and also with the vehicle running gear, that is to say the driven axle or axles, either permanently or via a clutch that may be disconnected. Such a hydrostatic machine is for instance described in the German Pat. No. 2,904,572 and may function either as a pump or as a motor dependent on the particular construction involved. Furthermore, in some cases, such a hydrostatic machine may be adjusted to determine which of its two connections functions as a high pressure connection and which functions as a low pressure one.

In the case of use with a differential drive (such as a standard or planetary differential), the manner of operation of the hydrostatic machine may be selectively set as pump or motor operation in accordance with the function required so that the connection between the hydrostatic machines and the engine or the driven axles takes place indirectly in this case.

The two hydrostatic machines are connected with each other by two power branches. During normal, unbraked running the hydrostatic machine connected with the engine, for example, runs as a pump supplying a hydraulic fluid along the duct branch at a high pressure so that owing to its displacement the fluid drives the other hydrostatic machine acting as a hydraulic motor.

In the hydrostatic machine on the output side, the pressure of the hydraulic fluid is converted, such fluid returning via a second duct branch at a low pressure back to the drive hydrostatic machine.

The high and low pressure ducts have a pressure limiting valve between them which opens and produces a connection, when the pressure in the high pressure duct exceeds a certainn value, in order to prevent damage to the hydraulic drive by any excessive pressures which may occur. Furthermore check valves are necessary via which hydraulic fluid may be fed into the duct system of the drive from a feed pump.

More particularly when they are heavily loaded, it is necessary for road trucks and omnibuses to use a sustained action brake in order to brake the vehicle as evenly as possible in certain driving situations, more especially when descending hills, over extended periods of time.

So far so-called engine brakes have been mainly used for this purpose in which the pumped power dissipation of a diesel engine is employed. Furthermore, eddy current brakes have been used.

The shortcoming with such known sustained action brakes is that they not only form a separate and expensive item of the equipment of the vehicle, but furthermore that their effect is comparatively difficult to regulate. In the case of gentle hills it may be that known types of such brakes give a stronger braking action than is desired by the driver. In such a case the sustained action brake will be switched on and off so that the speed of the vehicle is so irregular as to reduce the comfort of vehicle occupants.

SUMMARY OF THE INVENTION

On the basis of this situation, one aim of the invention is to so further develop vehicle transmissions of the sort initially noted that they are also capable of functioning as a sustained action brake.

In accordance with a further object of the invention, regulation of the sustained action brakes is to be made possible.

A further objective of the invention is to simplify the structure of the vehicle transmission.

In order to achieve these or other objects appearing in the course of the specification the hydrostatic drive is so designed that (a) at least one hydrostatic machine is designed for absorbing sustained action braking power, (b) at least one respective pressure limiting valve and a check valve are combined in the form of a threshhold pressure valve which in a first flow direction allows free flow from a first port to a second port, and in the opposite, second direction of flow only allows flow from the second to the first port inasfar as the flow exceeds a preset pressure value, (c) the two threshhold pressure valves each have a respective second port connected with a different respective one of the duct branches, (d) the two first ports of the threshhold pressure valves are joined together via a cooler, (e) a brake control device is connected with the hydrostatic machine designed for sustained action braking in order to switch it over to braking operation, or is connected with a two-way valve to change over the ports between the two duct branches and this hydrostatic machine, and (f) the feed pump is connected between the two threshold pressure valves.

The invention may be summarized by stating that firstly the hydrostatic machine connected with the running gear is so designed that it is able to absorb the power transmitted from the running gear to the drive to produce the sustained braking action. It is also possible for this braking energy to be divided up between the two hydrostatic machines, it then however being necessary for them to be designed in accordance with the ratio in which the energy is to be split up.

Either of the two duct branches may be the high pressure duct in accordance with the direction of travel and the setting of the output hydrostatic machine. To limit the pressure it is therefore necessary to provide two pressure limiting valves which act in opposite directions, and two check valves in order to permit free flow at each of the two pressure limiting valves in a direction opposite to its preset direction of flow.

In accordance with the invention, one respective pressure limiting valve and one check valve are combined as a common valve which is herein termed the threshold pressure valve. The threshold pressure valves provided in accordance with the invention each have their high pressure ports connected with one of the two duct branches and have their other ports connected together via a cooler. It is possible furthermore to have a plurality of threshold pressure valves that are connected on these lines.

During braking operation and dependent on the selected mode of operation the hydraulic fluid makes its way at a high pressure through one of the two duct branches and via the associated threshold pressure valve, that is effective as a pressure limiting valve. It is here that mechanical energy is converted into heat in a way involving the reduction in the pressure of the hydraulic fluid.

This heat is then dissipated in the following cooler. Owing to the combination of the pressure limiting valve and the check valve to form a respective threshold pressure valve it is possible to ensure that there are no parts of the ducts that are dead spaces in which there is no constant flow of the fluid. In fact, all the fluid is passed through the cooler during a single cycle so that there is no danger of overheating.

In accordance with a further significant feature of the invention there is a low pressure limiting valve between the cooler and one of the threshold pressure valves, and between the low pressure limiting port and one of the feed pump ports there is at least one cooler. When the oil temperature increases it is possible for the feed pump to supply a quantity of oil that is greater than that needed to make good leakage loses. This quantity of oil is cooled by the cooler and is with advantage passed via the low pressure limiting valve back to the storage tank. Furthermore the low pressure limiting valve provides for direct protection of the cooler against excess pressures so that the liability to failure of the system as a whole is greatly reduced.

Furthermore there is a brake operating device that is worked for sustained braking and for its part either sets the output hydrostatic machine or operates a valve placed between the same and the two duct branches, said two-way valve reversing the port connections between the two duct branches of the said hydrostatic machines when said valve is worked.

As we have already seen, it is necessary for one respective pressure limiting value and the associated check value to be combined as a single structure in order to ensure sufficient cooling of the hydraulic fluid at all times. At the same time however this measure ensures a considerable simplification in the structure of a known vehicle transmission as taken as a starting point by the present invention. Furthermore, the hydraulic circuit with this simplified design has less connections and ports so that the maximum operating pressure may be increased comparatively easily and it is also possible to run the drive of the invention with higher pressures on the high pressure side thereof than is the case with initially noted types of vehicle transmission.

During normal running in which the pressure necessary to trip the threshold pressure valves is not reached, there is hardly any flow through the cooler so that the unavoidable liquid friction in the cooler does not impair good overall efficiency of transmission. The cooler does however have a further particular advantage inasfar as it has hitherto been necessary, in order to make good consumed hydraulic fluid, to draw off the latter from a special supply tank by way of a pump, and it now becomes possible to use the oil sump of the driving engine as the supply tank and to feed the hot oil via a feed pump and possibly the engine oil pump also, to the transmission. In this case the cooler is utilized to cool the oil which has been supplied to make good the loss.

Such a manner of cooling is possible in a particularly simple form if the oil supplied to make good the loss is fed into the middle of the cooler or at and the point of connection between two coolers. And in such a case—dependent on the direction of the pressure differential between the two duct branches—the said supplied hydraulic fluid makes its way between the port and the cooler in the low pressure duct branch or the corresponding half of the cooler. Should it appear advantageous to utilize all of the cooler for cooling the said supplied oil, it is possible in accordance with another feature of the invention to feed the said supplied oil selectively via a control valve to the one or the other side of the cooler, that is to say at that side of the cooler which is furthest from the low pressure duct branch. The two-way valve or its spool may be adjusted to be in line with the respectively existing pressure conditions by using a pressure sensor in one or both of the duct branches, as for example a sensor in the form of a piston drive.

At all times during operation the cooler will be at the low pressure so that the pressure obtaining in the cooler may be overcome even by a relatively weak feed pump.

The invention will now be described in more detail with reference to the accompanying drawings, provided by way of example.

DESCRIPTION OF PREFERRED EMBODIMENT

Figure 1:
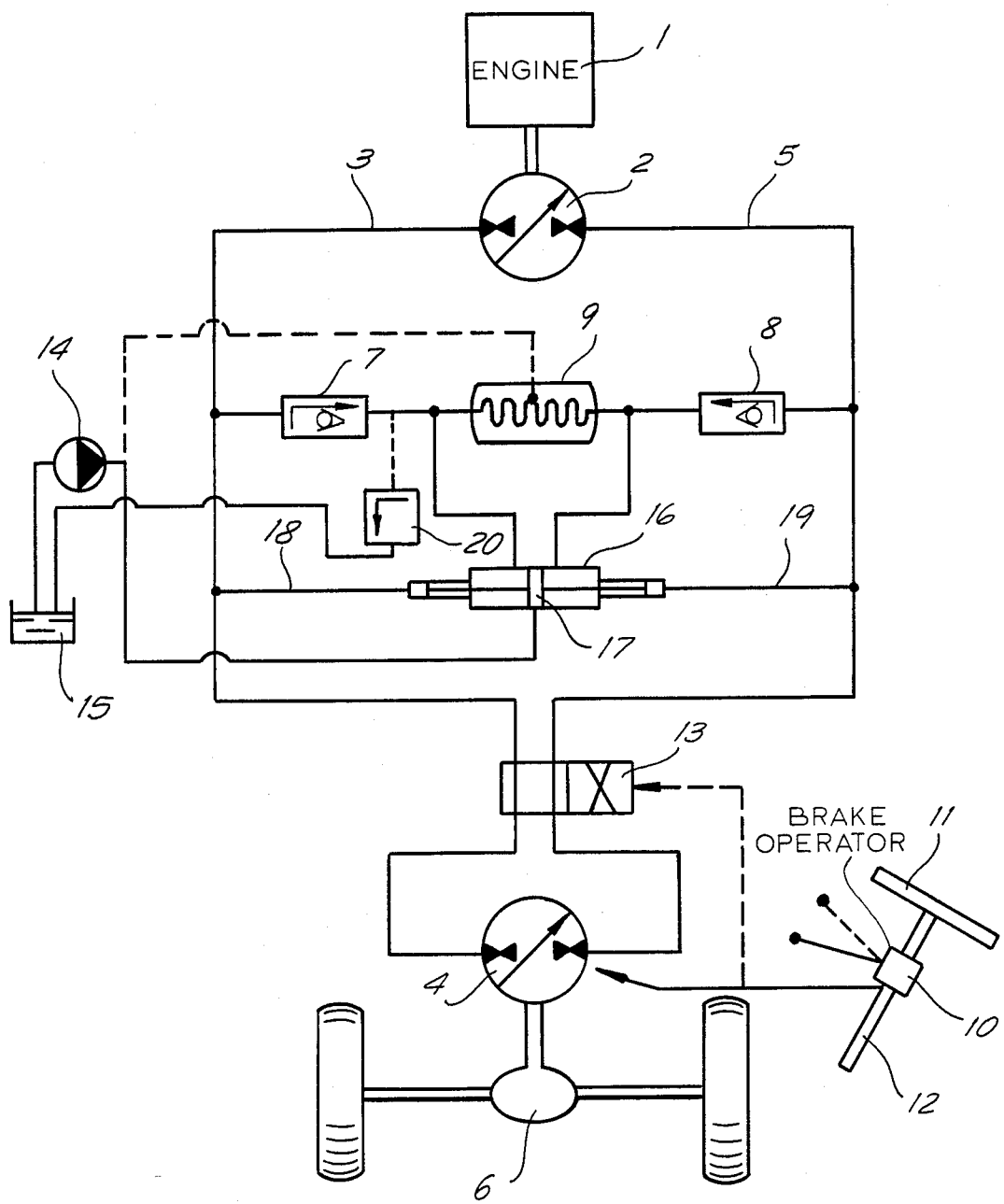
FIG. 1 is a schematic illustration of a hydrostatic drive according to the invention, showing several alternative embodiments in broken lines.

FIG. 1 shows an IC engine 1 whose output shaft is connected with a first hydrostatic machine 2 whose direction of pumping and pumping rate may be changed.

The first of two ports of the first hydrostatic machine 2 is connected via a duct 3 with the first port of a second hydrostatic machine 4, whose second port is joined with the port of the first hydrostatic machine 2 via a second duct 5.

A differential 6 is mechanically connected with the second hydrostatic machine 4.

The illustrated vehicle transmission furthermore has a cooler 9, which has two interconnected terminal ports and possibly a central port which will be described later.

Between one of the terminal connections of the cooler 9 and the duct branch 3 there is a first threshold pressure valve 7 whereas between the other terminal port of the cooler 9 and the duct branch 5 there is a second threshold pressure valve 8.

The design of each of these threshold pressure valves is such that same permits free flow from the cooler 9 whereas flow in the opposite direction to the cooler 9 is only possible if the fluid overcomes a very high, adjustable threshold pressure.

A brake operating device 10 is mounted on the steering column 12 of the steering wheel 11 of the vehicle.

Figure 2:
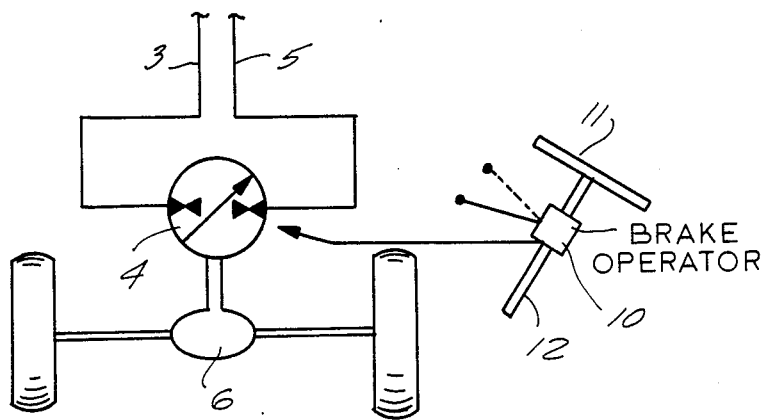
FIGS. 2-5 show portions of FIG. 1, and individual embodiments thereof.
Figure 3A:
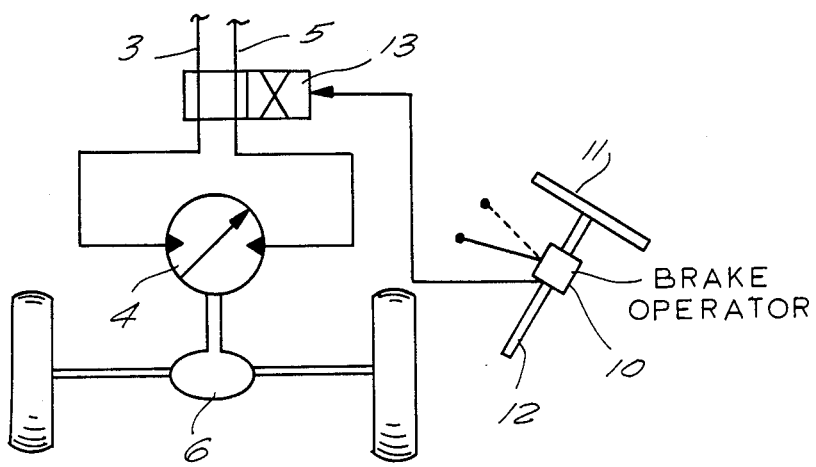
Figure 3B:
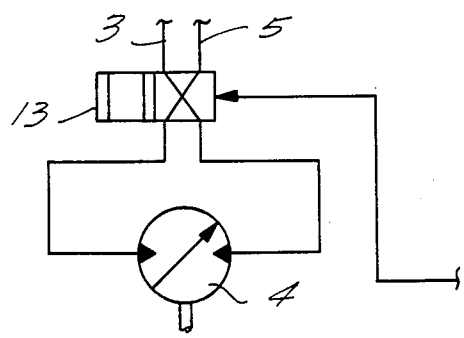

As shown in FIG. 2, the operating device 10 is connected with the output hydrostatic machine 4 which may be of a conventional type shiftable between operation as a motor and operation as a pump. Brake operation device 10 provides an electrical signal to hydrostatic machine 4 in order to change over same from unbraked, motor-operating condition to braked, pump-operating condition. As shown in FIGS. 3A and 3B, brake operating device 10 may alternatively be connected with a valve 13, which, when the brake operating device 10 is not actuated (FIG. 3A), produces the connections between the hydrostatic machine 4 and the two duct branches 3 and 5 as are needed for unbraked travel, whereas when the operating device 10 is actuated (FIG. 3B) these connections are reversed for braked travel.

The system further includes a feed pump 14 (FIG. 1), that draws oil from the sump 15 of the engine 1 and delivers it to the transmission to make up losses of oil therein.

Figure 4:
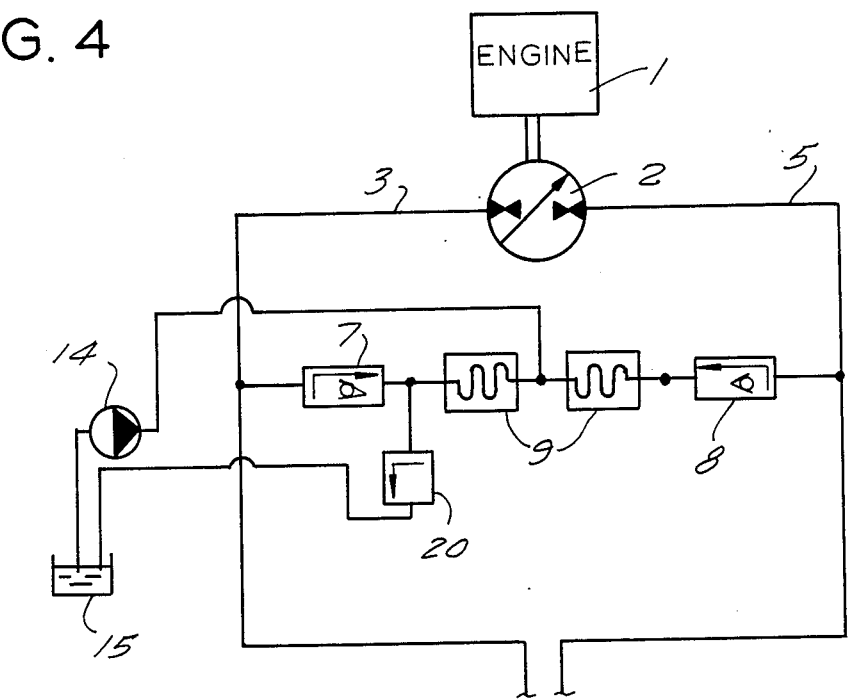

Since this oil is hot, it has to be passed through the cooler 9 during operation prior to its being introduced into the transmission as such. This may be accomplished, as illustrated in FIG. 4, by connecting the output from feed pump to a center tap of cooler 9 (FIG. 1) or by dividing cooler 9 into two separate coolers (FIG. 4) and connecting the output of feed pump 14 to a point between the coolers. In this case, whichever of the ducts 3 and 5 is at lower pressure, the hot oil from the sump will flow through one or the other of the cooler halves before entering the transmission. In the event of an oversupply of oil, the excess flows back to sump 15 through low pressure limiting valve 20.

Figure 5:
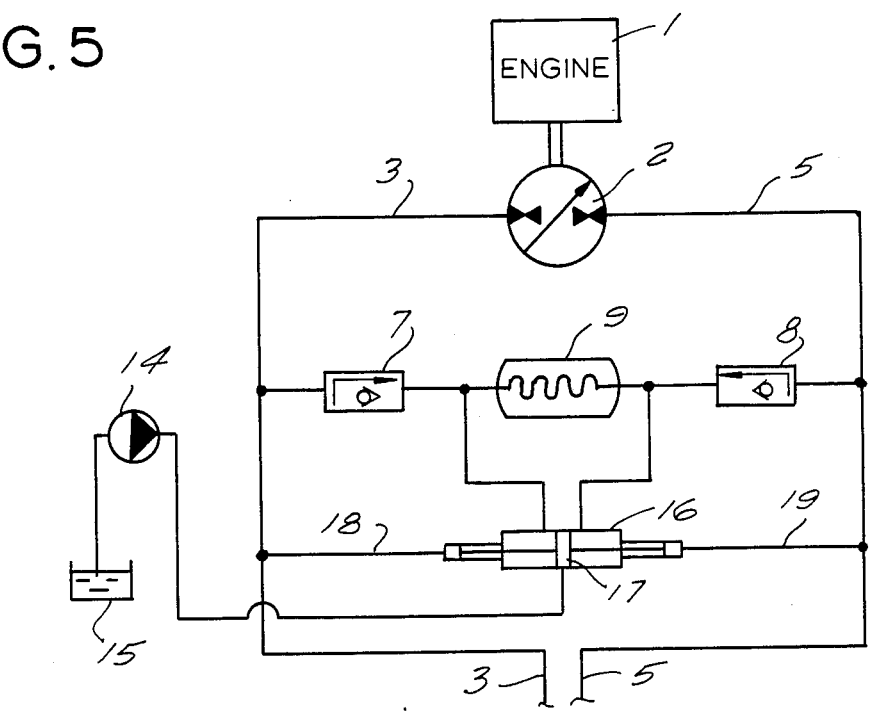

Alternatively, there is provided a control valve 16, (FIG. 5) which has an inlet port connected with the feed pump (engine oil pump) 14 and two outlet ports, of which each is connected with a respective one of the terminal or end ports of the cooler 9.

The spool 17 of the control valve 16 is connected via a control duct 18 with the duct branch 3 and a control line 19, respectively, with the duct branch 5 since the respective control duct 18 or 19 drives a small piston mechanically connected with the spool 17.

Figure 5A:
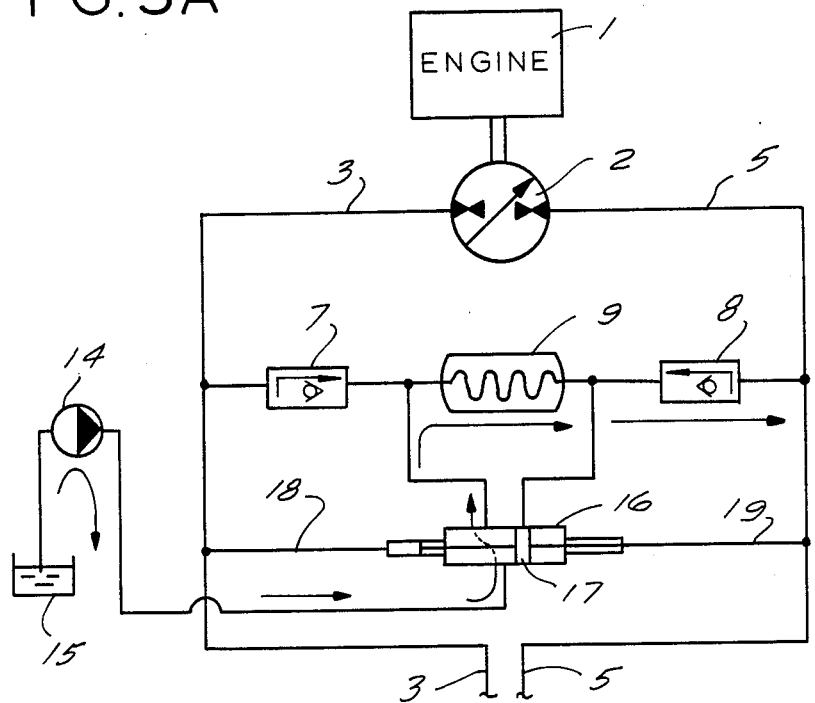
Figure 5B:
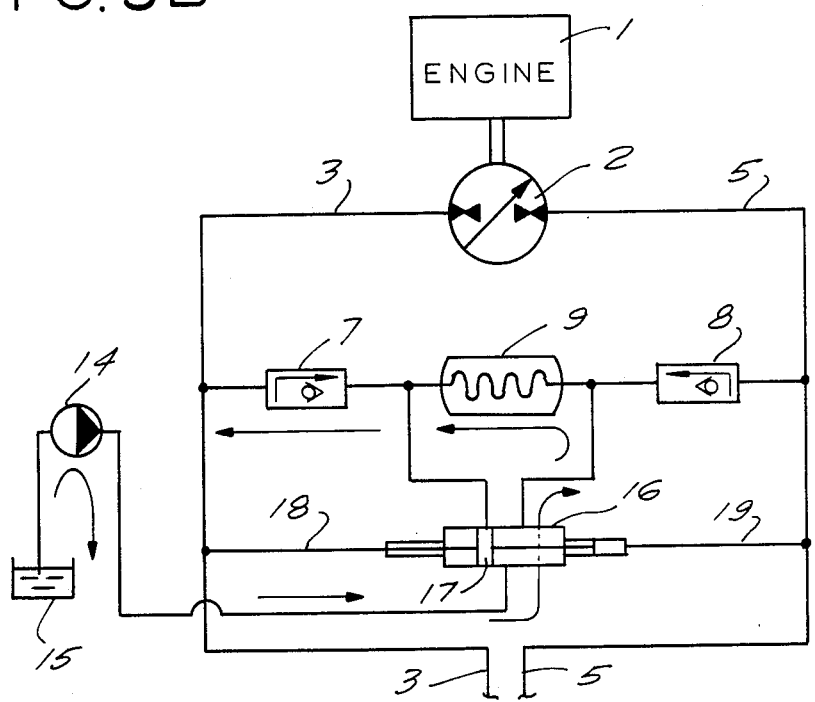

As will be seen in FIGS. 5A and 5B, the piston 17 moves in accordance with the direction of the pressure differential between the two duct branches 3 and 5 and thus ensures that the duct from the feed pump 14 is at all times joined with the high pressure side or end of the cooler 9 owing to its valve action, i.e. the valve action of the said piston 17.

We claim:
1. A hydrostatic drive comprising:
   a first hydrostatic machine having two ports and being capable of operating as a pump,
   a second hydrostatic machine having two ports and being capable of operating as a motor or as a pump,
   a first duct interconnecting one port of the first hydrostatic machine to one port of the second hydrostatic machine,
   a second duct interconnecting the other port of the first machine to the other port of the second machine,
   a cooler having two ports,
   a first threshold pressure valve between the first duct and one port of the cooler,
   a second threshold pressure valve between the second duct and the other port of the cooler,
   each threshold pressure valve allowing free flow of fluid from the cooler to its respective duct, but permitting flow of liquid from its respective duct to the cooler only when the pressure differential across the valve exceeds a predetermined value,
   a brake operating device,
   means responsive to actuation of the brake operating device to cause the second hydrostatic machine to operate as a pump for braking,
   a fluid supply, and
   a feed pump for delivering fluid from the supply to a point between the two threshold pressure valves.

2. A hydrostatic drive as defined in claim 1 wherein the cooler comprises two tandem-connected coolers, and the feed pump delivers fluid from the supply to a point between the two coolers.

3. A hydrostatic drive as defined in claim 2 including a low pressure limiting valve connected between the intake port of the feed pump and a point between the cooler and one of the threshold pressure valves.

4. A hydrostatic drive as defined in claim 1 including a control valve having an inlet port and two outlet ports, the feed pump being connected to the inlet port, and each outlet port being connected to a point between the cooler and one of the threshold pressure valves, and means for operating the control valve so that it connects the feed pump to the threshold pressure valve which is upstream from the cooler with respect to the direction of fluid flow through the cooler.

* * * * *